(12) United States Patent
Jokinen et al.

(10) Patent No.: US 6,620,294 B1
(45) Date of Patent: Sep. 16, 2003

(54) FORMULATIONS OF FLUORESCENT WHITENING AGENTS

(75) Inventors: Olli Juhani Jokinen, Kantvik (FI); Rainer Hans Traber, Reinach (CH); Peter Rohringer, Schönenbuch (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/049,030

(22) PCT Filed: Aug. 7, 2000

(86) PCT No.: PCT/EP00/07632

§ 371 (c)(1), (2), (4) Date: Feb. 8, 2002

(87) PCT Pub. No.: WO01/12900

PCT Pub. Date: Feb. 22, 2001

(30) Foreign Application Priority Data

Aug. 13, 1999 (EP) .............................. 99810730

(51) Int. Cl.[7] ....................... D21H 11/00; D21H 13/00; D21H 15/00

(52) U.S. Cl. ..................... 162/162; 162/158; 162/135; 562/87; 427/158; 252/389; 252/301.21

(58) Field of Search ................ 162/162, 158, 162/135; 427/158; 252/389, 301.21; 562/87

(56) References Cited

U.S. PATENT DOCUMENTS 4,147,648 A 4/1979 Günter et al. ................ 252/89

5,622,749 A 4/1997 Rohringer et al. .......... 427/158

FOREIGN PATENT DOCUMENTS

| DE | 2730246 | 1/1978 |
|---|---|---|
| EP | 0712960 | 5/1996 |
| EP | 0900784 | 3/1999 |
| GB | 1 275 162 | 5/1972 |

*Primary Examiner*—Steven P. Griffin
*Assistant Examiner*—M. Halpern
(74) *Attorney, Agent, or Firm*—Kevin T. Mansfield

(57) ABSTRACT

Stable formulations of fluorescent whitening agents are described. These contain a) 2 to 20% by weight of a fluorescent whitening agent of formula (1) in which $R_1$ is hydrogen, $C_1$–$C_5$-alkyl, $C_1$–$C_5$-alkoxy or halogen and M is hydrogen, an alkali metal, ammonium or magnesium, b) 4 to 30% by weight of an unmodified or modified polyvinyl alcohol, c) 55 to 94% by weight of water and d) 0 to 20% weight of further additives, polyethylene glycol being excluded. A process for the preparation of the formulations and their use for whitening paper materials is also described.

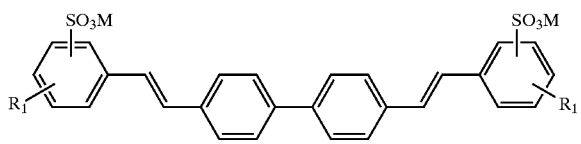

(1)

14 Claims, No Drawings

FORMULATIONS OF FLUORESCENT WHITENING AGENTS

This application is a 371 of PTC/EP00/07632 filed Aug. 7, 2000. The present Application relates to novel formulations of fluorescent whitening agents and their use for the whitening of paper.

Fluorescent whitening agents of the formula

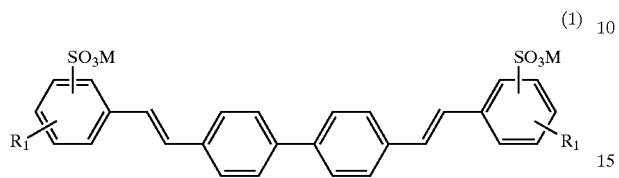

in which
  $R_1$ is hydrogen, $C_1$–$C_5$-alkyl, $C_1$–$C_5$-alkoxy or halogen and
  M is hydrogen, an alkali metal, preferably lithium, sodium or potassium, ammonium or magnesium, have long been known and are used, for example, for the whitening of paper materials.

These whitening agents are very sparingly soluble in water and are therefore usually commercially available in the form of slurries or of solutions which generally contain the sodium salt of the whitening agent and considerable amounts of a solubilizer, for example urea, or of an organic solvent, so that the whitening agent is completely dissolved. Since, after application, these solubilizers are undesired in the wastewater and moreover the organic solvents are generally flammable, there was a need for a formulation which contains no, or only small amounts of, such substances.

It has now been found that it is possible to prepare stable aqueous solutions of the fluorescent whitening agents of the abovementioned formula (1) if the whitening agents are dissolved in water together with a polyvinyl alcohol which may have been modified. Surprisingly, it is possible in this way to prepare solutions which contain up to 20% of whitening agent and have a shelf-life of several months at temperatures between 0 and 40° C. The addition of polyvinyl alcohol furthermore enhances the whitening effect of the whitening agent when applied to the surface, so that less active substance is required in order to achieve the same effect.

The present invention thus relates to formulations of fluorescent whitening agents which contain a) 2 to 20% by weight of a fluorescent whitening agent of the formula

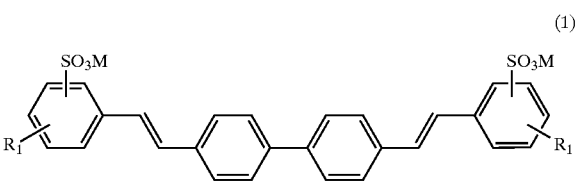

in which
  $R_1$ is hydrogen, $C_1$–$C_5$-alkyl, $C_1$–$C_5$-alkoxy or halogen and
  M is hydrogen, an alkali metal, ammonium or magnesium, b) 4 to 30% by weight of an unmodified or modified polyvinyl alcohol, c) 55 to 94% by weight of water and d) 0 to 20% by weight of further additives.

M is hydrogen or one equivalent of a colourless cation, for example lithium, sodium, potassium, ammonium or the protonated form of a $C_4$–$C_{12}$-trialkylamine, $C_4$–$C_{12}$diamine, $C_2$–$C_{15}$ralkanolamine or polyglycolamine. Preferably, M is potassium or in particular sodium.

Alkyl $R_1$ is, for example, methyl, ethyl, n-propyl, isopropyl, n-butyl, sec-butyl, tert-butyl, n-pentyl, isoamyl or sec-amyl. If, in the formula (1), $R_1$ is alkoxy, this is, for example, methoxy, ethoxy, n-propoxy, isopropoxy, n-butoxy, sec-butoxy, tert-butoxy, n-pentyloxy, isoamyloxy or sec-amyloxy. Halogen $R_1$ is fluorine, chlorine, bromine or iodine, preferably chlorine.

Suitable fluorescent whitening agents are in particular the come of the formula

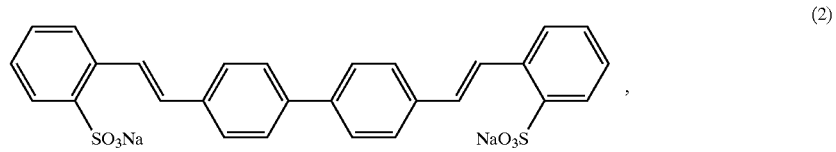

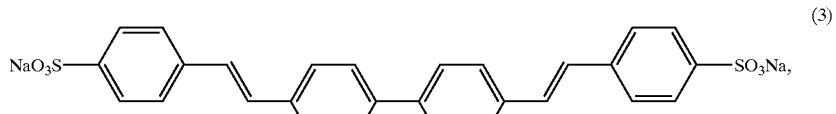

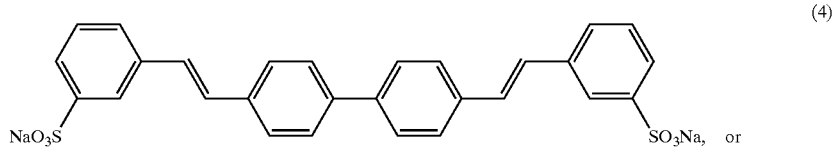

-continued

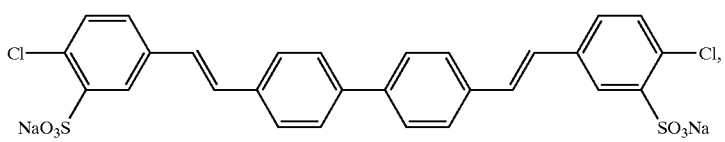
(5)

the compound of the formula (2) being particularly preferred.

Preferably, the formulations according to the invention contain 3 to 15% by weight, in particular 5 to 12% by weight, of fluorescent whitening agents of the formula (1).

Suitable unmodified or modified polyvinyl alcohols are, for example, those compounds which are obtained by more or less complete saponification of polyvinyl acetate. In particular, they are polyvinyl alcohols having a saponification number between 10 and about 450. The saponification number (ester number) denotes the amount of KOH in mg which is consumed for hydrolysing 1 g of polyvinyl alcohol. Such polyvinyl alcohols are commercially available, for example under the names Mowiol and Polyviol.

Preferably, the formulations according to the invention contain 6 to 20% by weight, in particular 6 to 15% by weight, of an unmodified or modified polyvinyl alcohol. Suitable further additives are, for example, preservatives, e.g. 1,2-benzoisothiazolin-3-one or aldehydes, such as formaldehyde, acetaldehyde or glutaraldehyde, and antifreezes, solvents or antifoams. Small amounts of solvent are added, for example, in order to obtain completely clear solutions from formulations which are slightly turbid. Polyethylene glycols are excluded as additives.

To eliminate turbidity of the formulations according to the invention, it is also possible to carry out a clarified filtration at elevated temperature, for example at 50 to 70° C.

The formulations according to the invention are obtained, for example, by thoroughly mixing the moist press cake or the dry powder of a fluorescent whitening agent of the formula (1) with an aqueous solution of an unmodified or modified polyvinyl alcohol and, if desired, further additives, if desired carrying out heating, for example to 30 to 80° C., and mixing them with one another until a homogeneous distribution is achieved.

The solutions obtained have a relatively long shelf-life, for example 6 months, even at temperatures of about 0° C. to 40° C.

The formulations according to the invention are suitable for whitening paper materials in paper-making, for example from bleached chemical or mechanical pulp or mixtures thereof, and for whitening the unpigmented, but in particular pigmented, paper materials and coating slips usually used in the paper industry, including size press and film press applications.

The present invention therefore furthermore relates to the use of the formulations according to the invention for the fluorescent whitening of fibre dispersions in paper-making.

The following examples serve to illustrate the invention without restricting it. In the following examples, parts and percentages are by weight, unless stated otherwise.

EXAMPLE 1

70 parts of an aqueous solution, which contains 20% by weight of polyvinyl alcohol (Polyviol LL603), and 50 parts of demineralized water are added to 30 parts of moist filter cake containing 9 parts of the fluorescent whitening agent of the formula

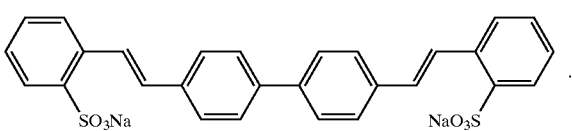
(2)

The mixture is heated to 55° C. while stirring and stirring is continued at this temperature until a clear solution has formed. After cooling to room temperature, any evaporated water is replenished so that 150 parts of solution are again obtained.

A whitening agent formulation which is stable for several months at 0° C. and at 40° C. is obtained.

EXAMPLE 2

A fibre suspension comprising 5 parts of fibre (1:1 mixture of bleached birch and pine kraft pulp; freeness 35°S.R.) in 200 parts of water having a hardness of 25 ppm of CaO is treated with 10% of precipitated calcium carbonate, based on fibre. Thereafter, 0.0275 part of the whitening agent solution obtained according to Example 1 is added, stirring is carried out slowly for 1 minute and 0.03%, based on the total weight of fibre and pigment, of a solution of commercial cationic retention aid (modified polyacrylamide) is added. Paper sheets are then produced on a sheet former (Rapid-Kothen system). The moist paper sheets are pressed and are dried between two sheets of filter paper for 20 minutes at 110° C.

Paper sheets whose fluorescence and whitening effect are just as good as those of paper sheets which are produced using commercial formulations of the same whitening agent as a solution containing urea are obtained.

EXAMPLE 3

The procedure is as described in Example 1, but Polyviol 2810 is used instead of Polyviol LL603 as the polyvinyl alcohol. Stable whitening agent formulations are likewise obtained.

EXAMPLES 4 TO 10

The procedure is as described in Example 1, but the polyvinyl alcohols stated in the following Table are used instead of Polyviol LL603. Stable whitening agent formulations are likewise obtained.

| Example Nr. | Polyvinyl Alcohol |
| --- | --- |
| 4 | Mowiol 3–98 |
| 5 | Mowiol 4–98 |
| 6 | Mowiol 6–98 |
| 7 | Mowiol 3–83 |

-continued

| Example Nr. | Polyvinyl Alcohol |
|---|---|
| 8 | Mowiol 4–80 |
| 9 | Mowiol 4–88 |
| 10 | Mowiol 5–88 |

In the above Table, the first number denotes the viscosity, in mPa·s, of a 4% by weight solution in water at 20° C., and the second number indicates the degree of saponification, in the case of the polyvinyl alcohols.

What is claimed is:

1. A formulation of a fluorescent whitening agent, which contains a) 2 to 20% by weight of a fluorescent whitening agent of the formula

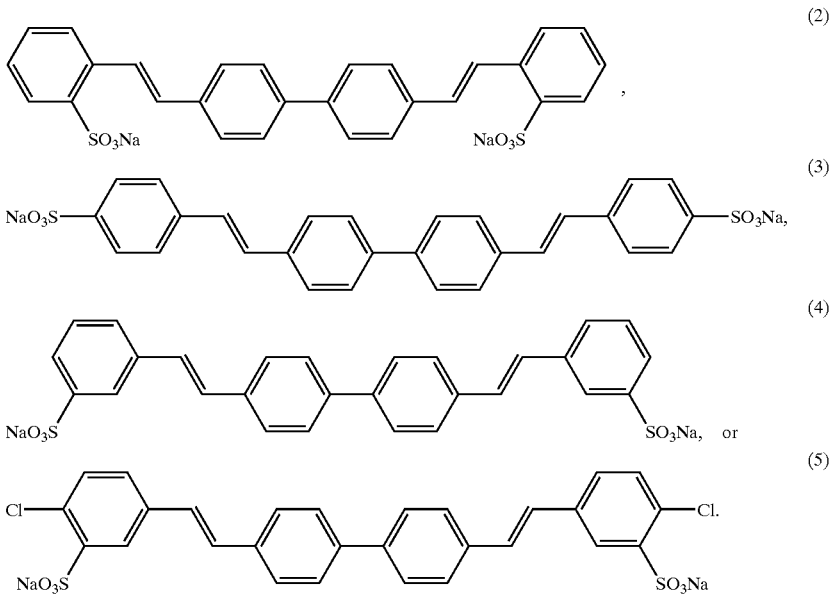

(1)

in which
$R_1$ is hydrogen, $C_1$–$C_5$-alkyl, $C_1$–$C_5$-alkoxy or halogen and
M is hydrogen, an alkali metal, ammonium or magnesium, b) 4 to 30% by weight of an unmodified or modified polyvinyl alcohol, c) 55 to 94% by weight of water and d) 0 to 20% by weight of further additives, polyethylene glycols being excluded.

2. A formulation according to claim 1, which contains a fluorescent whitening agent of the formula (1), in which M is potassium or sodium.

3. A formulation according to claim 1, which contains a fluorescent whitening agent of the formula (1) in which $R_1$ is hydrogen or chlorine.

4. A formulation according to claim 1, which contains 3 to 15% by weight of a fluorescent whitening agent of the formula (1).

5. A formulation according to claim 1, which contains a fluorescent whitening agent of the formula

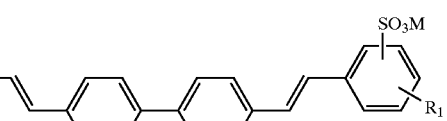

6. A formulation as defined in claim 1, which contains, as the unmodified or modified polyvinyl alcohol, a compound which was obtained by substantially complete saponification of polyvinyl acetate.

7. A formulation according to claim 6, which contains a polyvinyl alcohol having a saponification number between 10 and about 450.

8. A formulation according to claim 1, which contains 6 to 20% by weight of an unmodified or modified polyvinyl alcohol.

9. A formulation according to claim 1, which contains, as further additives, preservatives, antifreezes, solvents or antifoams.

10. A process for the preparation of a formulation according to claim 1, comprising thoroughly mixing a moist press cake or dry powder of a fluorescent whitening agent of the formula (1) with an aqueous solution of an unmodified or modified polyvinyl alcohol and, optionally, further additives, optionally carrying out heating, and mixing them with one another until a homogeneous distribution is achieved.

11. A process for the preparation of a formulation according to claim 10, comprising subsequently carrying out a clarified filtration at elevated temperature.

12. A formulation according to claim 4, which contains 5 to 12% by weight of a fluorescent whitening agent of the formula (1).

13. A formulation according to claim 5, which contains a fluorescent whitening agent of the formula (2).

14. A method for whitening paper materials in papermaking and for whitening pigmented and unpigmented coating slips conventionally used in the paper industry, which comprises applying a formulation as defined in claim 1 to the paper materials in a paper coating process or in a size press or film.

* * * * *